United States Patent [19]

Tominari et al.

[11] Patent Number: 4,668,752

[45] Date of Patent: May 26, 1987

[54] LINEAR ETHYLENE COPOLYMER

[75] Inventors: Kenichi Tominari; Hiroshi Inoue, both of Iwakuni; Masayuki Sakai, Ohtake, all of Japan

[73] Assignee: Mitsui Petrochemical Industries, Ltd., Tokyo, Japan

[21] Appl. No.: 663,557

[22] Filed: Oct. 22, 1984

[30] Foreign Application Priority Data

Oct. 21, 1983 [JP] Japan .................... 58-196081

[51] Int. Cl.$^4$ ............................................. C08F 210/16
[52] U.S. Cl. .................................. 526/348.2; 526/125; 526/348.3; 526/348.4; 526/348.5; 526/348.6
[58] Field of Search ............... 526/348.2, 348.3, 348.4, 526/348.5, 348.6

[56] References Cited

U.S. PATENT DOCUMENTS

| | | | |
|---|---|---|---|
| 4,071,674 | 1/1978 | Kashiwa et al. | 526/125 |
| 4,205,021 | 5/1980 | Morita et al. | 526/348.4 |
| 4,294,947 | 10/1981 | Doerk et al. | 526/348.6 |
| 4,311,752 | 1/1982 | Diedrich et al. | 526/348.6 |
| 4,328,328 | 5/1982 | Minami et al. | 526/348.6 |
| 4,363,904 | 12/1982 | Fraser et al. | 526/348.6 |
| 4,405,774 | 9/1983 | Miwa et al. | 526/348.6 |
| 4,412,042 | 10/1983 | Matsuura et al. | 526/348.6 |
| 4,438,238 | 3/1984 | Fukushima et al. | 526/348.6 |
| 4,438,243 | 3/1984 | Kashiwa et al. | 526/348.6 |
| 4,525,469 | 6/1985 | Ueda et al. | 526/138 |

FOREIGN PATENT DOCUMENTS

| | | | |
|---|---|---|---|
| 7647 | 2/1980 | European Pat. Off. | 526/348.6 |
| 70220 | 1/1983 | European Pat. Off. | 526/348.6 |
| 2378804 | 1/1978 | France | 210/2 |
| 1355245 | 6/1974 | United Kingdom . | |
| 2034723 | 6/1980 | United Kingdom | 210/2 |
| 2093047 | 8/1982 | United Kingdom | 210/16 |
| 2114584 | 8/1983 | United Kingdom | 526/348.6 |

*Primary Examiner*—Edward J. Smith
*Attorney, Agent, or Firm*—Sherman and Shalloway

[57] ABSTRACT

Ethylene/$C_4$–$C_{20}$ alpha-olefin copolymers are disclosed which have new characteristics in regard to composition distribution, degree of branching, randomness and crystallinity by DSC melting points. These copolymers have excellent transparency, impact strength, tear strength, blocking resistance, environmental stress cracking resistance, heat resistance and low-temperature heat sealability in a well-balanced combination when they have a density of at least 0.90. When their density is less than 0.90, these copolymers have particularly excellent transparency, impact strength and low-temperature heat sealability, and by incorporating them in various thermoplastic resins, they serve as an excellent modifier for improved impact strength and low-temperature heat sealability.

4 Claims, 2 Drawing Figures

LINEAR ETHYLENE COPOLYMER

This invention relates to ethylene/$C_4$–$C_{20}$ α-olefin copolymers which have new characteristics in regard to composition distribution, degree of branching, randomness and crystallinity by DSC melting points and are not described in the prior literature. These copolymers have excellent transparency, impact strength, tear strength, blocking resistance, environmental stress cracking resistance, heat resistance and low-temperature heat sealability in a well-balanced combination when they have a density of at least 0.90. When their density is less than 0.90, these copolymers have particularly excellent transparency, impact strength and low-temperature heat sealability, and by incorporating them in various thermoplastic resins, they serve as an excellent modifier for improved impact strength and low-temperature heat sealability.

More specifically, this invention relates to a copolymer of ethylene with at least one $C_4$–$C_{20}$ α-olefin having the following characteristics (A) to (J):

(A) It has a melt flow rate, determined by ASTM D 1238E, of from 0.01 to 200 g/10 min.,
(B) it has a density of from 0.850 to 0.930 g/cm$^3$,
(C) it has a composition distribution parameter (U), defined by the following equation (1)

$$U = 100 \times (Cw/Cn - 1) \qquad (1)$$

wherein Cw is the weight average degree of branching, and Cn is the number average degree of branching,
of not more than 50,
(D) the amount of components having a degree of branching of not more than 2/1000 carbons is not more than 10% by weight based on the ethylene copolymer,
(E) the amount of components having a degree of branching of at least 30/1000 carbons is not more than 70% by weight based on the ethylene copolymer,
(F) the ratio of the average block methylene chain length to the average methylene chain length is not more than 2.0,
(G) it has n melting points measured by a differential scanning calorimeter (DSC) (where n=1 or n≧3), in which the highest melting point ($T_1$) among these DSC melting points is given by the following expression (i)

$$(175 \times d - 46)\,°C. \leq T_1 \leq 125°\,C. \qquad (i)$$

wherein d is the density (kg/cm$^3$) of the copolymer, the difference between $T_1$ and the lowest melting point ($T_n$) among the DSC melting points is given by the following expression (ii)

$$18°\,C. < T_1 - T_n \leq 65°\,C. \qquad (ii),$$

and the difference between $T_1$ and the second highest melting point ($T_2$) is given by the following expression (iii)

$$0°\,C. < T_1 - T_2 \leq 20°\,C. \qquad (iii),$$

provided that when the number of melting points is one (i.e., n=1), only the expression (i) is applicable and the expressions (ii) and (iii) are not applicable,
(H) when n≦3 in the characteristic (G) above, the ratio of the amount of heat of crystal fusion ($H_1$) at the highest melting point $T_1$ to the total amount of heat of crystal fusion ($H_T$) is given by the following expression $$0 < H_1/H_T \leq 0.40,$$

(I) it has a crystallinity, measured by an X-ray diffraction method, of from 15 to 70%, and
(J) it has a molecular weight distribution $\overline{Mw}/\overline{Mn}$ where $\overline{Mw}$ is the weight average molecular weight of the copolymer and $\overline{Mn}$ is the number average molecular weight of the copolymer, measured by gel permeation chromatography, of from 2.5 to 10.

Low-density polyethylene (to be sometimes abbreviated as HP-LDPE) obtained by the high-pressure process has been extensively used as films, hollow containers, injection-molded articles, pipes, steel pipe coatings, cable and wire coatings, foamed articles, etc. because of its pliability and relatively good transparency. However, since HP-LDPE has poor impact strength, tear strength and environmental stress cracking resistance (to be sometimes abbreviated as ESCR), it is not suitable for use in fields requiring materials which are excellent in these properties and have the aforesaid good properties in a well balanced combination.

On the other hand, low-density polyethylenes (to be sometimes abbreviated as L-LDPE) obtained by copolymerizing ethylene with α-olefins having at least 3 carbon atoms under medium to low pressure conditions have better mechanical strength, ESCR and transparency than HP-LDPE, and therefore attract interest as a substitute of HP-LDPE in some applications. But the mechanical strength and optical properties of L-LDPE are still required to be improved, and it still does not have satisfactory heat sealability. Hence, L-LDPE cannot meet the recent requirement for high strength which arises from the higher speeds of packaging machines such as bag-making machines and filling and packing machines or the reduced thickness of packing materials. It has therefore been desired to develop materials which are excellent in these properties and at the same time have the inherent good properties metioned above in a well balanced combination.

An ethylene copolymer meeting this requirement was disclosed in U.S. Pat. No. 4,205,021 (corresponding to Japanese Laid-Open Patent Publication No. 92887/1978). Investigations of the present inventors, however, show that the ethylene copolymer specifically disclosed in this patent has a somewhat broad composition distribution and contains an unnegligible amount of components having low crystallinity and therefore does not have fully satisfactory composition distribution characteristics, and its blocking resistance is still desired to be improved.

Japanese Laid-Open Patent Publication No. 10541/1982 (corresponding to U.S. Pat. No. 4,405,774) proposes an ethylene copolymer having improved antiblocking property which has a melt flow rate of 0.1 to 100 g/10 min., a density of 0.91 to 0.94 g/cm$^3$ and a single DSC melting point, and in which the crystallinity (X) and the xylene absorption rate (Y) per unit amount of an amorphous portion have the relation $Y < -0.80X + 0.67$. The balance between the heat resistance and the low temperature heat sealability of this ethylene copolymer is poor. Attempts to improve the low-temperature heat sealability result in a reduction in heat resistance, and attempts to improve the heat resistance result in a reduction in low-temperature heat sealability. In attition, the antiblocking property of this ethylene copolymer is not sufficient.

Japanese Laid-Open Patent Publication No. 126809/1982 (corresponding to U.S. Pat. No. 4,438,238) proposes an ethylene/α-olefin copolymer having a specific long chain branching index and a specific short chain branching distribution. The proposed copolymer, however, has the disadvantage that its composition distribution is broad and its transparency and impact strength are unsatisfactory. It cannot be a material having various excellent properties in a well-balanced combination.

Japanese Patent Publication No. 21212/1971 (corresponding to U.S. Pat. No. 3,645,992) proposes a process for continuous production of a uniform random partially crystalline copolymer having a narrow molecular weight distribution in the presence of a vanadium-containing catalyst. The ethylene copolymer obtained by this process, however, has an extremely narrow molecular weight distribution and an extremely low crystallinity. Even when this ethylene copolymer is used to produce films and sheets, it is difficult to obtain products having heat resistance and low-temperature heat sealability in a well-balanced combination. Furthermore, this copolymer has inferior antiblocking property.

The present inventors have extensively worked on the development of an ethylene copolymer which has excellent mechanical properties, optical properties, blocking resistance, heat resistance and low-temperature heat sealability in a well-balanced combination.

First, they discovered that in an ethylene copolymer, particularly a copolymer of ethylene with a $C_4$-$C_{20}$ α-olefin, the combination of parameters of composition distribution characteristics, the degree of branching, randomness, DSC melting points, crystallinity and molecular weight distribution is an important factor for imparting the aforesaid excellent properties and maintaining a good balance among them.

Further work based on this new finding has finally led to the discovery that an ethylene/$C_4$-$C_{20}$ α-olefin copolymer having the characteristics (A) to (J) stated above can be produced, and has various excellent properties in a well balanced combination. It has been found that when its density is at least 0.90 g/cm$^3$, this copolymer has excellent transparency, impact strength, tear strength, antiblocking property, environmental stress cracking resistance, heat resistance and low-temperature heat sealability in a well balanced combination. It has further been found that when its density is less than 0.90 g/cm$^3$, this copolymer has excellent transparency, impact strength and low-temperature heat sealability and a broader molecular weight distribution and better moldability than the uniform random partially crystalline copolymer produced in the presence of a vanadium-containing catalyst, and by incorporating it into various thermoplastic resins, its serves as an excellent modifier for improved impact strength and low-temperature heat sealability.

It is an object of this invention therefore to provide a new type of ethylene copolymers.

The above and other objects and advantages of this invention will become apparent from the following description.

The ethylene copolymer of this invention is defined by the characteristics (A) to (J) which will be described below in detail.

The ethylene copolymer of this invention is a substantially linear copolymer of ethylene with an α-olefin having 4 to 20 carbon atoms, preferably 4 to 18 carbon atoms, especially preferably 4 to 12 carbon atoms. At least one α-olefin may be used. Examples of the α-olefin are 1-butene, 1-pentene, 1-hexene, 4-methyl-1-pentene, 1-heptene, 1-octene, 1-decene, 1-tetradecene, 1-octadecene, and mixtures of these. When propylene, i.e. $C_3$ α-olefin, is used, the resulting copolymer has poor tear strength, impact strength and environmental stress cracking resistance.

The content of the α-olefin units constituting the ethylene copolymer of this invention is optionally within the range which meets the specific composition distribution defined by the characteristics (C), (D) and (E) given hereinabove. Usually, it is 0.5 to 40 moles %, preferably 0.5 to 30 mole %, and especially preferably 1.5 to 2.0 mole %.

The ethylene copolymer of the invention has a substantially linear structure. The substantially linear structure, as referred to herein, means a linear structure having branches based on the α-olefin but being free from long chain branches and crosslinkages. This is confirmed by the fact that the ethylene copolymer completely dissolves in n-decane at 130° C.

The ethylene copolymer of this invention has a melt flow rate (MFR) of from 0.01 to 200 g/10 min., preferably from 0.05 to 150 g/10 min. [characteristic (A)].

The MFR is measured in accordance with ASTM D1238E. If the MFR exceeds 200 g/10 min., the ethylene copolymer has poor moldability and mechanical strength. If it is less than 0.01 g/10 min., its moldability is also deteriorated undesirably.

The ethylene copolymer of this invention has a density of from 0.850 to 0.930 g/cm$^3$, preferably 0.880 to 0.930 g/cm$^3$ [characteristic (B)].

The density is measured in accordance with ASTM D1505. If the density exceeds 0.930 g/cm$^3$, the transparency, tear strength, impact strength and low-temperature heat sealability of the copolymer are deteriorated, and if it is less than 0.850 g/cm$^3$, the antiblocking property of the copolymer becomes poor.

The ethylene copolymer of this invention has a composition distribution parameter (U), defined by the following equation $$U = 100 \times (Cw/Cn - 1) \tag{1}$$

wherein Cw represents a weight average degree of branching and Cn represents a number average degree of branching,
of not more than 50, for example $0 < U \leq 50$, preferably not more than 40, more preferably not more than 30 [characteristic (C)].

U is a parameter showing the distribution of components of the copolymer which is irrelevant to its molecular weight. As the characteristics (D), (E), (F), (G), etc. to be described below, it is an important characteristic which specifies the structure of the copolymer of this invention. If U exceeds 50, the composition distribution of the copolymer is too broad, and the copolymer has poor transparency, tear strength, impact strength, blocking resistance and low-temperature heat sealability. It is difficult therefore to provide the desired excellent properties in a well balanced combination.

Cw and Cn used in equation (1) for calculating U are determined by the following method.

The copolymer (10 g) is added to about 2 liters of a mixture of p-xylene and butyl Cellosolve (80:20 by volume) and the mixture is heated at about 130° C. in the presence of 2,5-di-tert.butyl-4-methylphenol (0.1% by weight based on copolymer) as a heat stabilizer. Then, about 1 kg of diatomaceous earth (tradename Celite #560, made by Johns-Manville Company, U.S.A.) is added to the resulting solution, and the mixture is cooled to room temperature with stirring. This operation results in coating the copolymer on diatomaceous earth. Then, the entire mixture is filled in a jacketed cylindrical column (diameter about 3 cm) which is set perpendicularly. While the column is maintained at a temperature of 30° C., a solvent having the same composition as the above mixed solvent in the same volume as a solution flowing from the bottom of the column is passed (about 1 liter/hr) through the column from its top. The solution flowing out from the bottom of the column is collected in a receiver. To the collected solution is added methanol in an amount twice the volume of the collected solution to precipitate the eluted copolymer. After confirming that upon addition of methanol, the copolymer no longer precipitates, the flowing of the solution is stopped. The temperature of the column is then raised to 35° C., and the flowing of the solution and the passing of the mixed solvent are resumed and continued until the copolymer no longer flows out. The foregoing operation is carried out at intervals of 5° C. until the operation is finally carried out at 120° C. The copolymer fractions precipitated from methanol are separated by filtration and dried to obtain fractions.

The weight of each of the fractions is then measured, and the degree of branching per 1000 carbons [C] of each of the fractions is determined by the $^{13}$C-NMR method shown below with regard to the characteristic (D).

Since the degree of branching per 1000 carbons [C] of the fraction decreases as the eluting temperature rises, the cumulative weight fractions [I(W)] are calculated in the decreasing order of the eluting temperature. Under the assumption that the number of branches per 1000 carbons [C] and the cumulative weight fraction [I(W)] in each fractionated portion follow the integral function of the logarithmic normal distribution, which is the following equation (2), parameters $\beta$ and $C_o$ equation (2) are determined by using the method of least square.

$$I(w) = \frac{1}{\beta \sqrt{\pi}} \int_0^c \exp\left[ -\frac{1}{\beta^2} (\ln C/C_o)^2 \right] d(\ln C) \quad (2)$$

$\beta$ and $C_o$ are given by the following equations.

$$\beta^2 = 2 \ln(Cw/Cn) \quad (3)$$

$$C_o^2 = Cw \cdot Cn \quad (4)$$

Thus, Cn and Cw can be easily calculated.

The amount of components having a degree of branching of not more than 2/1000 carbons (not more than 2 branches per 1000 carbons of the main chain of the copolymer) is not more than 10% by weight, for example 10 to 0% by weight, preferably not more than 5% by weight, more preferably not more than 3% by weight [characteristic (D)].

The characteristic (D) is a parameter which means that the amount of components which have too small a degree of branches bonded to the main chain of the copolymer is small, and which together with the composition distribution parameter U, specifies the structure of the ethylene copolymer of this invention. If the copolymer contains more than 10% by weight of components having a degree of branching of not more than 2/1000 C, it has poor transparency, tear strength, impact strength, and low temperature heat sealability, and it is difficult to provide the desired excellent properties in a well balanced combination.

The degree of branching, as used herein, denotes the number of branches per 1000 carbons in the copolymer chain, and is determined in accordance with the method disclosed in G. J. Ray, P. E. Johnson and J. R. Knox, Macromolecules, 10, 773 (1977) from the area intensity of a signal of methylenic carbon adjacent to a branch observed by the $^{13}$C-NMR spectrum. For example, when the comonomers are a copolymer of butene-1 and 4-methylpentene-1, the positions of the chemical shifts of the signals assigned to the above methylenic carbons are respectively 33.8 ppm and 34.5 ppm with TMS (tetramethylsilane) as a standard.

In the ethylene copolymer of this invention, the amount of components having a degree of branching of at least 30/1000 carbons is not more than 70% by weight, for example 70 to 0% by weight, preferably not more than 20% by weight, more preferably not more than 5% by weight [characteristic (E)].

The characteristic (E) is a parameter which means that the amount of components having a main chain structure in which the number of branches bonded to the main chain of the copolymer is too large is small. It is an important characteristic which together with the composition distribution parameter U [characteristic (C)] and the branching degree condition [characteristic (D)], specifies the structure of the copolymer of this invention. If the amount of components having at least 30 branches/1000 C exceeds 70% by weight, the copolymer has deteriorated antiblocking property and tends to soil an object with which it makes contact.

The amounts of components having not more than 2 branches/1000 carbons and components having at least 30 branches/1000 carbons are determined as follows: The relation between the cumulative weight fractions and the degrees of branching obtained from the fractionation of the copolymer performed in determining U with regard to the characteristic (C) is plotted on a graph, and the points corresponding to two branches/1000 C and 30 branches/1000 C on the graph are interpolated. The cumulative weight fractions corresponding to these points are determined based on the results, and the above amounts can thus be determined.

The ethylene copolymer of this invention has an n-decanesoluble content at 23° C. of usually 0 to 60% by weight, preferably 0 to 5% by weight, more preferably 0 to 2% by weight. The n-decane-soluble content, as referred to herein, is determined by dissolving 10 g of the ethylene copolymer in 1 liter of n-decane at 130° C. in the presence of 2,5-tert.butyl-4-methylphenol as a heat stabilizer, maintaining the solution at 130° C. for 1 hour, cooling the solution to 23° C. at a rate of 1° C./min., measuring the weight of the precipitated ethylene copolymer, subtracting the measured weight from 10 g, and calculating the percentage of the difference based on 10 g.

In the ethylene copolymer of this invention, the ratio of the average block methylene chain length to average methylene chain length is not more than 2.0, for example 2.0 to 1.0, preferably 1.7 to 1.0, more preferably 1.5 to 1.0 [characteristic (F)].

This characteristic (F) is a parameter which shows the random structure of ethylene and the α-olefin in the molecular chains of the copolymer, and is one of the important characteristics which together with the characteristics (C) to (E), specifies the structure of the ethylene copolymer of this invention. If the ratio exceeds 2.0, the copolymer has inferior transparency, tear strength, impact strength, blocking resistance and low-temperature heatsealability, and it is difficult to provide the desired excellent properties in a well balanced combination.

In the present invention, the above ratio in characteristic (F) is determined from the average methylene chain length calculated by using $^{13}$C-NMR and the average block methylene chain length calculated by excluding the case where the number of methylene groups between two adjacent branches is not more than 6, and defined as the ratio of the average block methylene chain length to the average methylene chain length. The block methylene chain length is the number of methylene groups between branches determined from the signals of the third and fourth and subsequent methylenic carbons observed when the number of methylene groups between branches is at least 7. The positions of the chemical shifts of the signals assigned to the third and fourth and subsequent methylenes are 30.1 ppm and 29.6 ppm, respectively, with TMS as a standard.

The ethylene copolymer of this invention has n melting points measured by a differential scanning calorimeter (DSC) (where n=1 or n≧3), and the highest melting point ($T_1$) among these DSC melting point or points is given by the following expression (i)

$$(175 \times d - 46)°C. \leq T_1 \leq 125° C., \quad \text{(i)}$$

preferably $$(175 \times d - 45)°C. \leq T_1 \leq 113° C.$$

wherein d is the density (g/cm$^3$) of the copolymer.

The difference between $T_1$ and the lowest melting point ($T_n$) among the DSC melting points is given by the following expression (ii)

$$18° C. < T_1 - T_n \leq 65° C., \quad \text{(ii)}$$

preferably $$18° C. < T_1 - T_n \leq 50° C.,$$

more preferably $$18° C. < T_1 - T_n \leq 30° C.$$

and the difference between $T_1$ and the second highest melting point ($T_2$) is given by the following expression (iii)

$$0° C. < T_1 - T_2 \leq 20° C., \quad \text{(iii)}$$

preferably $$0° C. < T_1 - T_2 \leq 15° C.,$$

more preferably $$2° C. \leq T_1 - T_2 \leq 10° C.$$

When the number of melting points is one (i.e., n=1), only the expression (i) is applicable and expressions (ii) and (iii) are not applicable.

The above DSC melting points and their relation are a parameter which together with the characteristic (H) described below, has to do with the crystallinity characteristics of the ethylene copolymer of this invention. This parameter is one of the important characteristics which together with the characteristics already described above, specifies the structure of the copolymer of this invention. If $T_1$ in the characteristic (G) is less than $(175 \times d - 46)°C$. (d is as defined above), the copolymer has reduced heat resistance. If $T_1$ is higher than 125° C., the transparency and the low-temperature heat sealability of the copolymer are inferior. When $T_1 - T_n$ is higher than 65° C. or $T_1 - T_2$ exceeds 20° C., the tear strength, impact strength and low-temperature heat sealability of the copolymer are deteriorated, and it is difficult to provide the desired excellent properties in a well balanced combination.

In the present invention, the DSC melting points in characteristic (G) and the amount of heat of crystal fusion ($H_1$) and the amount of heat of crystal fusion ($H_T$) are measured and determined by the following methods.

Using a differential scanning calorimeter, 3 mg of a sample is melted at 200° C. for 5 minutes. Then, the temperature is lowered to 20° C. at a rate of 10° C./min. The sample is then maintained at this temperature for 1 minute, and again heated to 150° C. at a rate of 10° C./min. Thus, a DSC endothermic curve is obtained.

Figure 1:
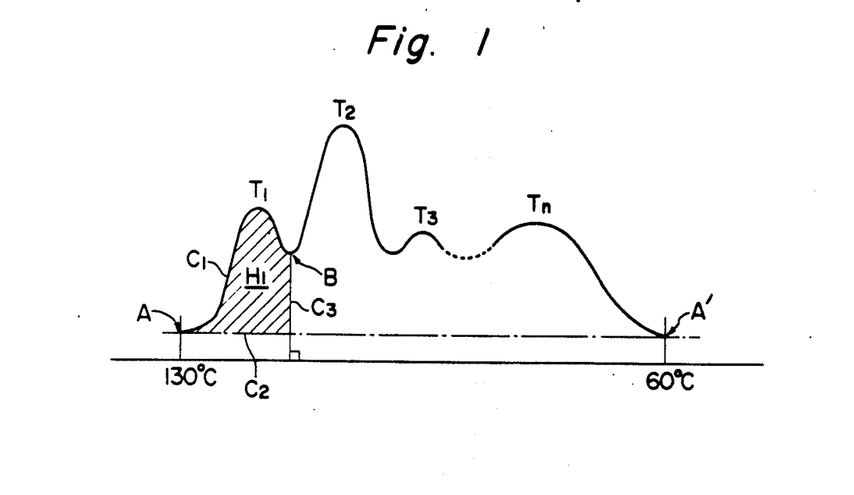
FIGS. 1 and 2 accompanying this application are charts showing examples of DSC endothermic curves of the ethylene copolymers of this invention.
Figure 2:
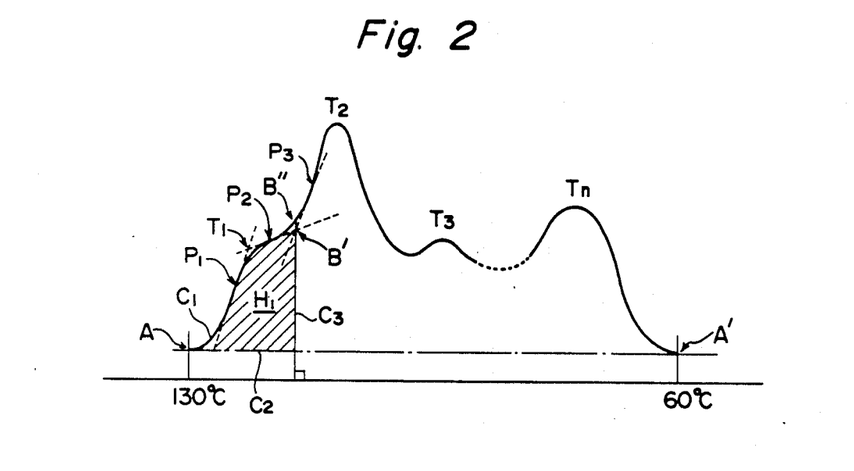

Among the endothermic peaks in the DSC endothermic curve, $T_1$ in FIG. 1 appearing as a peak on the highest temperature side or as a shoulder or $T_1$ in FIG. 2 (the intersecting point of tangential lines drawn at the deflection point $P_1$ on the high temperature side of the shoulder and the deflection point $P_2$ on the low temperature side of the shoulder) is the highest melting point ($T_1$). As shown in FIGS. 1 and 2, a plurality of DSC points are designated as $T_1, T_2, \ldots T_n$ from the high temperature side to the low temperature side. $T_2$ is the highest melting point, and $T_n$ is the lowest melting point. Where n is 1, only $T_1$ exists.

On the other hand, as shown in FIGS. 1 and 2, the amount of heat of a portion defined by the straight line connecting the points at 60° C. and 130° C. of the endothermic curve (the base line A—A' in the drawings) and the endothermic curve between them is defined as the total amount of heat of crystal fusion ($H_T$). Furthermore, as shown in FIG. 1, when the highest melting point ($T_1$) appears as a peak, a perpendicular $C_3$ is drawn from the minimum point B of the curve immediately on the low temperature side of $T_1$ to the temperature axis of co-ordinates, and the amount of heat of the hatched portion defined by the perpendicular $C_3$, the base line A—A' (the portion $C_2$ in the drawing) and the endothermic curve (the curve portion $C_1$ between A and B in the drawing) is defined as the amouont of heat of crystal fusion ($H_1$) at the highest melting point ($T_1$). When the highest melting point ($T_1$) appears as a shoulder as shown in FIG. 2, a perpendicular $C_3$ is drawn from the intersecting point B' of tangential lines drawn at the deflection point $P_2$ immediately on the low temperature side of the shoulder and the deflection point $P_3$ on the high temperature side of $T_2$ to the temperature axis of co-ordinates, and the amount of heat of the hatched portion defined by the perpendicular $C_3$, the base line A—A' (the portion $C_2$ in the drawing) and the endothermic curve (the curve portion $C_1$ between A and the intersection B" of the curve and the extension of $C_3$) is defined as the amount of heat of crystal fusion ($H_1$) at the highest melting point ($T_1$).

In the ethylene copolymer of this invention, the ratio of the amount of heat of crystal fusion ($H_1$ as defined above) at the highest melting point ($T_1$) among the DSC melting points to the total amount of heat of crystal fusion ($H_T$ as defined above) is $0 < H_1 < H_T \leq 0.40$, preferably $0.01 \leq H_1/H_T \leq 0.35$ [characteristic (H)]. This characteristic is applicable only where $n \geq 3$ in the characteristic (G).

The ratio of the amounts of heat of fusion, $H_1/H_T$, in the characteristic (H) is related to the crystallinity characteristics by DSC melting points of the ethylene copolymer of this invention together with the characteristic (G). If the $H_1/H_T$ ratio exceeds 0.40, the tear strength, impact strength and low-temperature heat sealability of the copolymer are deteriorated. In combination with the other characteristics, this characteristic (H) serves to provide the desired excellent properties of the copolymer of this invention in a well balanced combination.

The ethylene copolymer of this invention has a crystallinity, measured by an X-ray diffraction method, of 15 to 70%, preferably 30 to 70%, more preferably 40 to 65% [characteristic (I)]. If the crystallinity is too high beyond 70%, the tear strength, impact strength and low-temperature heat sealability of the copolymer are reduced. If it is too low below 15%, the copolymer has drastically reduced antiblocking property and heat resistance. Accordingly, it should be within the above-specified range.

The crystallinity of the ethylene copolymer is determined by the X-ray diffraction method. This method uses a straight line connecting diffraction angles 7° to 31.5° as a background, and otherwise follows the method described in the literature [S. L. Aggarwal and G. P. Tilley: J. Polym. Sci., 18, 17 (1955)].

In the ethylene copolymer of this invention, the molecular weight distribution $\overline{M}w/\overline{M}n$ wherein $\overline{M}w$ is the weight average molecular weight of the copolymer and $\overline{M}n$ is the number average molecular weight is given by the following expressions [characteristic (J)].

$$2.5 \leq \overline{M}w/\overline{M}n \leq 10,$$

preferably $$2.5 \leq \overline{M}w/\overline{M}n \leq 7,$$

more preferably $$2.5 \leq \overline{M}w/\overline{M}n \leq 5.$$

If the molecular weight distribution of the ethylene copolymer exceeds 10, its impact strength and environmental stress cracking resistance are markedly reduced, and if it is less than 2.5, its moldability is deteriorated.

The molecular weight distribution $\overline{M}w/\overline{M}n$ is measured by GPC (gel-permeation chromatography) under the following conditions.

Device: Model 150C, made by Waters Co.
Column: TSK GMH-6 (6 mm $\phi \times 600$ mm) made by Toyo Soda Co., Ltd.
Solvent: ortho-dichlorobenzene (ODCB)
Temperature: 135° C.
Flow rate: 1.0 ml/min.
Injecting concentration: 30 mg/20 ml ODCB (the amount injected 400 microliters)

When column elution volume is corrected by the universal method using standard polystyrene made by Toyo Soda Co., Ltd. and Pressure Chemical Co.

The copolymer of this invention can be produced, for example, by copolymerizing ethylene with at least one $C_4$-$C_{20}$ α-olefin in the presence of a catalyst composition composed of (a) a titanium component containing titanium, magnesium and halogen as essential ingredients and obtained by treating (a-1) a highly active solid component having a specific surface area of at least 50 m²/g with (a-2) an alcohol,
(b) an organoaluminum compound component, and
(c) a halogen compound component, so that a copolymer having the aforesaid characteristics is formed (when a part or the whole of the component (b) of the catalyst composition is an organoaluminum compound containing halogen, the component (c) can be omitted).

The highly active solid component (a-1) is a component which can by itself be used as a highly active titanium catalyst component, and is well known. Basically, the component (a-1) can be obtained by reacting a magnesium compound and a titanium compound with or without an auxiliary reagent so as to obtain a solid component having a high specific surface area. The solid component (a-1) has a specific area of at least about 50 m²/g, for example about 50 to about 1000 m²/g, and preferably about 80 to about 900 m²/g. Generally, the solid component (a-1) contains about 0.2 to about 18% by weight, preferably about 0.3 to about 15% by weight, of titanium, and has a halogen/titanium atomic ratio of from about 4 to about 300, preferably from about 5 to about 200, and a magnesium/titanium atomic ratio of from about 1.8 to about 200, preferably from about 2 to about 120.

The component (a-1) may contain other elements, metals, functional groups, electron donors, etc. in addition to the essential ingredients. For example, aluminum and silicon may be used as the other elements and metals. Examples of the functional groups are alkoxy and aryloxy groups. Examples of the electron donors are ethers, carboxylic acids, esters and ketones. One preferred example of the method of producing the solid component (a-1) is a method which comprises treating a complex of a magnesium halide and an alcohol with an organic metal compound, for example an organoaluminum compound such as a trialkylaluminum or an alkyl aluminum halide, and reacting the treated product with a titanium compound. The details of this method are described in the specification of U.S. Pat. No. 4,071,674, for example.

The alcohol (a-2) used to treat the highly active solid component (a-1) may be an aliphatic, alicyclic or aromatic alcohol which may have a substituent such as an alkoxy group. Specific examples of the alcohol are methanol, ethanol, n-propanol, isopropanol, tert-butanol, n-hexanol, n-octanol, 2-ethylhexanol, n-decanol, oleyl alcohol, cyclopentanol, cyclohexanol, benzyl alcohol, isopropylbenzyl alcohol, cumyl alcohol and methoxyethanol. Aliphatic alcohols having 1 to 18 carbon atoms are especially preferred.

Treatment with the alcohol is preferably carried out in an inert hydrocarbon such as hexane and heptane. For example, it is preferred to suspend the solid component (a-1) in the inert hydrocarbon to a concentration of 0.005 to 0.2 mole/liter, especially 0.01 to 0.1 mole/liter, and to contact it with the alcohol in an amount of 1 to 80 moles, especially 2 to 50 moles, per titanium atom in the solid component (a-1). The reaction conditions can be properly selected depending upon the kind of the alcohol. For example, the reaction can be carried out at a temperature of about $-20$ to about $+100°$ C., preferably about $-10$ to about $+100°$ C. for several minutes to about 10 hours, preferably about 10 minutes to about 5 hours. As a result of the alcohol treatment, the alcohol (a-2) is taken in the form of an alcohol and/or alkoxy group in the solid component (a-1). Preferably, the amount of the alcohol (a-2) so taken into the component (a-1) is 3 to 100 moles, especially 5 to 80 moles, per titanium atom. By this reaction, a part of titanium is sometimes liberated from the solid component (a-1). When such a solvent-soluble component exists, the resulting titanium catalyst component is preferably washed with an inert solvent after the reaction, and then used for the polymerization.

The organoaluminum compound component (b) to be used together with the titanium component (a) is typically a compound of the general formula $R_nAlX_{3-n}$ (wherein R represents a hydrocarbon group, for example a $C_1-C_{15}$ alkyl group or a $C_2-C_8$ alkenyl group, X represents a halogen atom, and $0 < n \leq 3$). Specific examples include trialkyl aluminums such as triethyl aluminum and triisobutyl aluminum; dialkyl aluminum halides such as diethyl aluminum chloride and diisobutyl aluminum chloride; alkyl aluminum sesquihalides such as ethyl aluminum sesquichloride and ethyl aluminum sesquibromide; and alkyl aluminum dichloride such as ethyl aluminum dichloride. When the halogen compound component (c) is not used, it is desirable to use the component (b) so that in its general formula, n is preferably $1.5 \leq n \leq 2.0$, more preferably from $1.5 \leq n \leq 1.8$ as an average composition.

The halogen compound component (c) is, for example, a halogenated hydrocarbon such as ethyl chloride or isopropyl chloride, or silicon tetrachloride which can act as a halogenating agent for the component (b). When the component (c) is used, its amount is preferably such that the total amount of the halogens in the components (b) and (c) is from 0.5 to 2 atoms, particularly from 1 to 1.5 atoms, per aluminum atom in the component (b).

The copolymerization of ethylene with the $C_4-C_{20}$ $\alpha$-olefin can be carried out in the liquid or vapor phase in the presence of the catalyst composition composed of components (a), (b) and (c) described above in the presence or absence of an inert diluent such as an inert hydrocarbon at a temperature of, for example, 0° to about 300° C. In particular, the desired ethylene copolymer can be easily obtained by performing the copolymerization in the presence of an inert hydrocarbon under conditions in which the resulting ethylene copolymer dissolves, at a temperature of, for example, about 120° to 300° C., preferably about 130° to 250° C. The ratio between ethylene and the $C_4$-$C_{20}$ $\alpha$-olefin can be properly selected.

In performing the copolymerization, the amount of the titanium catalyst component (a) used is, for example, about 0.0005 to about 1 millimole/liter, preferably about 0.001 to about 0.1 mole/liter, calculated as titanium atom. The amount of the organoaluminum compound (b) is that which serves to maintain polymerization activity. Desirably, it is used so that the Al/Ti atomic ratio becomes from about 1 to about 2,000, preferably from about 10 to about 500. The polymerization pressure is generally atmospheric pressure to about 100 $kg/cm^2$, especially about 2 to about 50 $kg/cm^2$.

The ethylene copolymers of this invention have better transparency, impact strenth, tear strength, blocking resistance, low-temperature heat sealability, heat resistance and ESCR than not only HP-LDPE but also conventional L-LDPE, and retain these excellent properties in a well balanced combination. Accordingly, they are especially suitable for use as packaging films. These copolymers can be processed into various articles such as films, containers, pipes, tubes and household goods by various molding methods such as T-die molding, inflation film molding, blow molding, injection molding and extrusion. Various types of composite films can be formed by extrusion coating on other films or by coextrusion. They can also be used as steel pipe coatings, cable coatings or foamed articles. The copolymers of this invention may be used as blends with other thermoplastic resins, for example polyolefins such as HP-LDPE, medium-density polyethylene, high-density polyethylene, polypropylene, poly-1-butene, poly-4-methyl-1-pentene, ethylene/propylene or 1butene copolymers which have low crystallinity or are amorphous, and propylene/1-butene copolymer. It is also possible to incorporate petroleum resins, waxes, heat stabilizers, weather stabilizers, antistatic agents, antiblocking agents, slip agents, nucleating agents, pigments, dyes, inorganic or organic fillers, synthetic rubbers, natural rubbers, etc. into the copolymers of this invention.

Among the ethylene copolymers of this invention, those having a density of less than 0.90 $g/cm^3$ have particularly excellent transparency, impact strength and low-temperature sealability. They can be used in the same applications as those having a density of at least 0.90 $g/cm^3$. But when these low-density copolymers are incorporated in various thermoplastic resins, the impact strength, low-temperature impact strength and low-temperature heat sealability of these thermoplastic resins can be improved greatly. Accordingly, they can be used as excellent modifiers for the thermoplastic resins. For use as modifiers for the thermoplastic resins, the ethylene copolymer may be used without modification. If desired, however, it can be used as a modified product. Examples of the modified product are modified ethylene copolymers obtained by graft copolymerizing the ethylene copolymer with aromatic unsaturated hydrcarbons such as styrene, $\alpha$-methylstyrene, vinyltoluene and indene; and modified ethylene copolymers obtained by graft copolymerizing the ethylene copolymer with unsaturated carboxylic acids and the anhydrides or esters thereof, such as acrylic acid, methacrylic acid, maleic acid, fumaric acid, citraconic acid, itaconic acid, endocis-5,6-dicarboxy-2-norbornene, methyl-endocis-5,6-dicarboxy-2-norbornene, maleic anhydride, citraconic anhydride, itaconic anhydride, endocis-2-norbornene-5,6-dicarboxylic anhydride, methyl acrylate, methyl methacrylate, dimethyl maleate, dimethyl fumarate, dimethyl citraconate, dimethyl itaconate and dimethyl endocis-2-norbornene-5,6-dicarboxylate. The content of the modifying component in the modified ethylene copolymer is usually 0.01 to 100 parts by weight, preferably 0.1 to 50 parts by weight, per 100 parts by weight of the ethylene copolymer. The proportion of the ethylene copolymer or the modified ethylene copolymer to be incorporated is usually 0.1 to 100 parts by weight, preferably 0.2 to 50 parts by weight, per 100 parts by weight of the thermoplastic resin.

Various thermoplastic resins can be modified by the ethylene copolymers of this invention or their modified products. Examples include the above-exemplified polyolefins, styrene polymers such as polystyrene, poly-($\alpha$-methylstyrene), acrylonitrile/styrene copolymer and acrylonitrile/butadiene/styrene copolymer, polyesters such as polyethylene terephthalate and polybutylene terephthalate, polyamides such as polycaprolactoate, polyhexamethylene adipamide, polyhexamethylene sebacamide and polydecamethylene adipamide, polyarylene oxides such as poly(2,6-dimethylphenylene oxide), polyoxymethylene and polycarbonate.

The thermoplastic resin composition modified by the incorporation of the ethylene copolymer or the modified ethylene copolymer may further include heat stabilizers, weatherability stabilizers, antistatic agents, antiblocking agents, lubricants, nucleating agents, pigments, dyes, and inorganic or organic fillers as required.

The following examples illustrate the present invention more specifically.

The properties of the ethylene copolymer obtained by this invention were evaluated by the following methods.

Specifically, the copolymer was formed into a film having a width of 350 mm and a thickness of 50 microns by means of a commercial tubular film forming machine for high-pressure polyethylene (manufactured by Modern Machinery Company) under the following conditions.

Resin temperature: 180° C.
Screw rotating speed: 100 rpm
Die diameter: 100 mm
Die slit width: 0.7 mm The resulting film was evaluated by the following methods.

Haze (%)

In accordance with ASTM D 1003

Impact strength (kg-cm/cm)

Measured by a film impact tester made by Toyo Seiki Co., Ltd. The spherical surface of the impact head had a diameter of 1 inch.

Elmendorf tear strength (kg/cm)

In accordance with ASTM D1922.

Blocking value (g)

Measured substantially in accordance with ASTM D1893. The peeling bar was made of glass, and the peeling speed was adjusted to 20 cm/min.

Heat seal starting temperature (°C.)

Using a heat sealer made by Toyo Tester Co., Ltd., two films were heat-sealed over a 1 cm width at a given temperature (to be referred to as the heat seal temperature) under a pressure of 2 kg/cm$^2$ for a sealing time of 1 second. From the two films integrated by heat sealing, a rectangular test sample having a width of 15 mm and a length of 60 mm was cut out. One short side of the test sample was heat-sealed and the other short side was left open. By using a tensile tester, the two open ends of the test sample were clamped by an air chuck and pulled at a pulling speed of 300 mm/min. at room temperature to perform a peeling test. At this time, the sample was observed to determine whether the breakage was due to peeling or occurred at parts other than the heat-sealed surface.

The above operation was repeated at varying heat seal temperatures, and the heat seal temperature at which the breakage began to occur at the parts other than the heat-sealed surface was defined as the heat seal starting temperature.

EXAMPLE 1

Preparation of a Catalyst

In an atomosphere of nitrogen, 1 mole of commercial anhydrous magnesium chloride was suspended in 2 liters of purified dehydrated hexane, and with stirring, 6 moles of ethanol was added dropwise over 1 hour. Then, the reaction was carried out at room temperature for 1 hour. To the reaction mixture was added dropwise 2.6 moles of diethyl aluminum chloride at room temperature, and the mixture was stirred for 2 hours. Then, 6 moles of titanium tetrachloride was added, and the mixture was heated to 80° C. The reaction was carried out at this temperature for 3 hours with stirring. After the reaction, the solid portion was separated, and repeatedly washed with purified hexane. The solid (designated A-1) had the following composition.

| Ti | Cl | Mg | Al | OEt* | (wt. %) |
|---|---|---|---|---|---|
| 3.7 | 67.0 | 20.0 | 0.4 | 4.8 | |

Ethanol (500 millimoles) was added at room temperature to 50 millimoles, calculated at Ti, of A-1 suspended in purified hexane. The mixture was heated to 80° C., and reacted for 1 hour. After the reaction, the reaction mixture was cooled to room temperature, and 150 millimoles of triethyl aluminum was added. The reaction was carried out for 1 hour with stirring. After the reaction, the solid portion was repeatedly washed with purified hexane. The resulting catalyst (B-1) had the following composition.

| Ti | Cl | Mg | Al | OEt* | (wt. %) |
|---|---|---|---|---|---|
| 2.8 | 59.3 | 13.7 | 0.5 | 23.6 | |

*The resulting solid was decomposed and extracted with H$_2$O-acetone, and then quantitatively determined as ethanol by gas chromatography.

Polymerization

A 200-liter continuous polymerization reactor was charged continuously with 100 liters/hr of purified dehydrated hexane, 15 millimoles/hr of ethyl aluminum sesquichloride and 1.0 millimole/hr, as Ti, of the catalyst (B-1) obtained as above, and 13 kg/hr of ethylene, 13 kg/hr of 4-methyl-1-pentene and 30 liters/hr of hydrogen were simultaneously fed continuously into the reactor. The monomers were copolymerized at a polymerization temperature of 165° C. and a total pressure of 30 kg/cm$^2$ with a residence time of 1 hour while maintaining the concentration of the copolymer in the hexane solvent at 130 g/liter. The catalytic activity corresponded to 13,000 g of the copolymer/mmole of Ti.

The properties of the copolymers were evaluated, and the results are shown in Table 2.

EXAMPLES 2 TO 6

Continuous copolymerization was carried out in the same way as in Example 1 using the same reactor and the same catalyst component (B-1) as in Example 1 except that the types of the organoaluminum component and the alpha-olefin were changed as shown in Table 1. The polymerization conditions are shown in Table 1, and the vrious properties of the copolymers are shown in Tables 2 and 3.

Comparative Example 1

Example 1 was repeated except that instead of (B-1), (A-1) before reaction with ethanol was used as a Ti catalyst component. The catalytic activity was 19,100 g of the copolymer/mmole of Ti. The properties of the copolymer are shown in Table 3. The resulting copolymer had a slightly broad composition distribution and contained a highly crystalline portion and a portion having a low crystallinity. Hence, its anti-blocking property was insufficient.

COMPARATIVE EXAMPLE 2

In the procedure of Example 1, 20 mmoles/1 hr of triethyl aluminum was used as the organoaluminum component, 0.42 mmole/hr, as Ti atom, of (A-1) before reaction with ethanol was used instead of (B-1) as the Ti catalyst component, and 13 kg/hr of ethylene, and 30 kg/hr of 4-methyl-1-pentene were continuously fed together with 40 liters/hr of hydrogen, and polymerized. The catalytic activity corresponded to 31,000 g of the copolymer/mmole of Ti.

The properties of the copolymer are shown in Table 3.

The resulting polymer had a considerably broad composition distribution and contained large amounts of a highly crystalline portion and a low crystalline portion. Hence, it had poor transparency, antiblocking property and low-temperature heat sealability.

COMPARATIVE EXAMPLE 3

A 2-liter autoclave was charged with 0.8 liter of purified dehydrated hexane and 0.2 liter of 4-methyl-1-pentene, and the inside of the autoclave was purged with nitrogen. Then, 2.0 mmoles of triethyl aluminum, and 0.02 mmole, calculated as Ti atom, of the Ti catalyst used in Comparative Examples 2 and 3 were introduced into the autoclave. Subsequently, hydrogen was introduced to a pressure of 0.6 kg/cm$^2$. Ethylene was then added to a total pressure of 2.5 kg/cm$^2$. While the polymerization temperature was maintained at 70° C., the polymerization was carried out for 2 hours. There was obtained 295 g of a copolymer.

The catalytic activity corresponded to 14,800 g of the copolymer/mmole of Ti.

The properties of the resulting copolymer are shown in Table 3.

The polymer obtained had a very broad composition distribution and showed a single melting point at 124.5° C. Hence, it had poor low-heat sealability.

TABLE 1

| | | Promoter | | α-Olefin | | | Catalytic activity |
|---|---|---|---|---|---|---|---|
| Example | Ti (B-1) (mmole/hr) | Type | Amount (mmole/hr) | Type | Amount (kg/hr) | Hydrogen (l/hr) | (g-copolymer/mmole-Ti) |
| 2 | 1.0 | Et$_{1.5}$AlCl$_{1.5}$ | 15 | 4-Methyl-1-pentene | 20 | 15 | 11700 |
| 3 | 0.9 | " | 15 | " | 17 | 30 | 12600 |
| 4 | 0.9 | " | 15 | " | 27 | 5 | 13300 |
| 5 | 0.8 | " | 10 | " | 5 | 70 | 15000 |
| 6 | 1.2 | " | 20 | 1-Butene | 11 | 10 | 7000 |

TABLE 2

| | α-Olefin | Proportion of the α-olefin (mole %) | (A) MFR (g/10 min.) | (B) Density | Degree of branching (number/1000 C.) | (C) U | (D) Amount of component having a degree of branching of not more than 2/1000 C. (wt. %) | (E) Amount of components having a degree of branching of at least 30/1000 C. (wt. %) |
|---|---|---|---|---|---|---|---|---|
| Example | | | | | | | | |
| 1 | 4-Methyl-1-pentene | 3.5 | 2.15 | 0.913 | 16.4 | 15 | 0.4 | 4.5 |
| 2 | 4-Methyl-1-pentene | 5.4 | 2.02 | 0.902 | 24.2 | 18 | 0.1 | 18.0 |
| 3 | 4-Methyl-1-pentene | 4.5 | 2.12 | 0.908 | 20.6 | 18 | 0.1 | 8.5 |
| 4 | 4-Methyl-1-pentene | 6.6 | 2.06 | 0.893 | 29.2 | 30 | 0.4 | 50.6 |
| 5 | 4-Methyl-1-pentene | 1.5 | 1.97 | 0.931 | 7.2 | 7 | 1.9 | 0.1 |
| 6 | 1-Butene | 7.9 | 2.62 | 0.898 | 36.6 | 20 | 0.1 | 30.0 |
| Comparative Example | | | | | | | | |
| 1 | 4-Methyl-1- | 2.4 | 1.94 | 0.922 | 13.2 | 55 | 7.8 | 13.2 |

TABLE 2-continued

| | | | | | | | | |
|---|---|---|---|---|---|---|---|---|
| 2 | 4-Methyl-1-pentene | 2.7 | 2.10 | 0.920 | 15.5 | 108 | 9.2 | 14.5 |
| 3 | 4-Methyl-1-pentene | 2.0 | 1.87 | 0.926 | 18.7 | 280 | 23.5 | 6.8 |

| | n-Decane-soluble content at 23° C. (wt. %) | (F) Methylene chain length ratio | n | Highest melting point $T_1$ (°C.) | $T_2$ | $T_3$ | $T_1 - T_n$ (°C.) | $T_1 - T_2$ (°C.) | $H_1/H_T$ | Crystallinity (%) | (J) $M_w/M_n$ |
|---|---|---|---|---|---|---|---|---|---|---|---|
| Example | | | | | | | | | | | |
| 1 | 0.30 | 0.20 | 3 | 120.5 | 115.3 | 102 | 18.5 | 5.2 | 0.09 | 49.0 | 2.74 |
| 2 | 1.70 | 1.25 | 3 | 121.7 | 113.5 | 91.8 | 29.9 | 8.2 | 0.09 | 42.6 | 3.11 |
| 3 | 0.62 | 1.27 | 3 | 122.1 | 114.6 | 97 | 25.1 | 7.5 | 0.08 | 47.6 | 2.66 |
| 4 | 8.40 | 1.40 | 3 | 123.0 | 112.0 | 85 | 38.0 | 11.0 | 0.10 | 40.3 | 3.03 |
| 5 | 0.01 | 1.07 | 1 | 119.6 | — | — | 0 | 0 | 1 | 59.5 | 2.55 |
| 6 | 3.30 | 1.24 | 3 | 119.0 | 103.5 | 82.5 | 37.0 | 15.5 | 0.06 | 28.5 | 2.91 |
| Comparative Example | | | | | | | | | | | |
| 1 | 3.10 | 1.67 | 3 | 123.2 | 118.7 | 104 | 19.2 | 4.5 | 0.25 | 54.0 | 3.18 |
| 2 | 3.20 | 1.80 | 3 | 124.4 | 121.2 | 105 | 19.4 | 3.2 | 0.28 | 53.0 | 3.28 |
| 3 | 2.10 | 2.83 | 1 | 124.5 | — | — | 0 | 0 | 1 | 57.0 | 3.52 |

TABLE 3

| | Haze (%) | Impact strength (kg-cm/cm) | Elmendorf tensile strength MD (kg/cm) | Elmendorf tensile strength TD (kg/cm) | Blocking value (g) | Heat seal starting temperature (°C.) |
|---|---|---|---|---|---|---|
| Example | | | | | | |
| 1 | 4.8 | 6200 | 98 | 164 | 2.5 | 115 |
| 2 | 3.1 | Not broken | 96 | 162 | 6.5 | 100 |
| 3 | 3.9 | Not broken | 97 | 162 | 5.0 | 110 |
| 4 | 2.5 | Not broken | 96 | 162 | 11.5 | 95 |
| 5 | 9.7 | 3000 | 50 | 130 | 0.1 | 125 |
| 6 | 2.0 | Not broken | 21 | 62 | 10.7 | 95 |
| Comparative Example | | | | | | |
| 1 | 12.5 | 3300 | 110 | 176 | 5.7 | 130 |
| 2 | 16.7 | 3100 | 102 | 175 | 7.5 | 135 |
| 3 | 20.8 | 2200 | 87 | 167 | 6.9 | 140 |

What we claim is:

1. A copolymer of ethylene with at least one $C_4$-$C_{20}$ α-olefin having the following characteristics (A) to (J)

(A) it has a melt flow rate, determined by ASTM D 1238E, of from 0.01 to 200 g/10 min., (B) it has a density of from 0.880 to less than 0.900 g/cm$^3$ (C) it has a composition distribution parameter (U), defined by the following equation (1)

$$U = 100 \times (Cw/Cn - 1) \quad (1)$$

wherein Cw is the weight average degree of branching, and Cn is the number average degree of branching,
of not more than 50, (D) the amount of components having a degree of branching of not more than 2/1000 carbons is not more than 10% by weight based on the ethylene copolymer, (E) the amount of components having a degree of branching of at least 30/1000 carbons is not more than 70% by weight based on the ethylene copolymer, (F) the ratio of the average block methylene chain length to the average methylene chain length is not more than 2.0, (G) it has n melting points measured by a differential scanning calorimeter (DSC) (wherein n=1 or n≧3), in which the highest melting point ($T_1$) among these DSC melting points is given by the following expression (i)

$$(175 \times d - 46)°C. \leq T_1 \leq 125° C. \quad (i)$$

wherein d is the density (g/cm$^3$) of the copolymer, the difference between $T_1$ and the lowest melting point ($T_n$) among the DSC melting points is given by the following expression (ii)

$$18° C. < T_1 - T_n \leq 65° C. \quad (ii),$$

and the difference between $T_1$ and the second highest melting point ($T_2$) is given by the following expression (iii)

$$0° C. < T_1 - T_2 \leq 20° C. \quad (iii)$$

provided that when the number of melting points is one (i.e., n=1), only the expression (i) is applicable and the expressions (ii) and (iii) are not applicable, (H) when n≧3 in the characteristic (G) above, the ratio of the amount of heat or crystal fusion ($H_1$) at the highest melting point $T_1$ to the total amount of heat of crystal fusion ($H_T$) is given by the following expression $$0 < H_1/H_T \leq 0.40,$$

(I) it has a crystallinity, measured by an X-ray diffraction method, of from 15 to 70%, and (J) it has a molecular weight distribution $\overline{M}w/\overline{M}n$ wherein $\overline{M}w$ is the weight average molecular weight of the copolymer and $\overline{M}n$ is the number average molecular weight of the copolymer, measured by gel permeation chromatography of from 2.5 to 10.

2. The copolymer of claim 1 which (G) has three melting points measured by a differential scanning calorimeter (n=3).

3. The copolymer of claim 1 which comprises from 0.5 to 40 mole % of said α-olefin, said α-olefin having from 4 to 12 carbon atoms.

4. The copolymer of claim 1 wherein the composition distribution parameter U is $0<U\leqq 40$.

* * * * *

UNITED STATES PATENT AND TRADEMARK OFFICE
CERTIFICATE OF CORRECTION

PATENT NO. : 4,668,752
DATED : May 26, 1987
INVENTOR(S) : Tominari, et al.

It is certified that error appears in the above-identified patent and that said Letters Patent is hereby corrected as shown below:

Column 17, line 68, claim 1, delete "$n \leq 3$", insert --$n \geq 3$--.

Signed and Sealed this

Second Day of February, 1988

*Attest:*

DONALD J. QUIGG

*Attesting Officer*  *Commissioner of Patents and Trademarks*